(12) United States Patent
Olsa et al.

(10) Patent No.: US 9,792,195 B2
(45) Date of Patent: Oct. 17, 2017

(54) TERMINAL DATA LOGGER

(75) Inventors: Jiri Olsa, Brno (CZ); Anton Arapov, Vranov (CZ)

(73) Assignee: Red Hat, Inc., Raleigh, NC (US)

( * ) Notice: Subject to any disclaimer, the term of this patent is extended or adjusted under 35 U.S.C. 154(b) by 632 days.

(21) Appl. No.: 13/034,556

(22) Filed: Feb. 24, 2011

(65) Prior Publication Data

US 2012/0221949 A1    Aug. 30, 2012

(51) Int. Cl.
*G06F 15/16*    (2006.01)
*G06F 11/34*    (2006.01)

(52) U.S. Cl.
CPC ...... *G06F 11/3495* (2013.01); *G06F 11/3476* (2013.01)

(58) Field of Classification Search
CPC ..... H04L 43/10; H04L 43/04; H04L 43/0876; G06F 11/3476; G06F 11/3495
USPC ......................... 709/224, 226, 203, 225, 204
See application file for complete search history.

(56) References Cited

U.S. PATENT DOCUMENTS

| | | | |
|---|---|---|---|
| 6,351,826 B1 * | 2/2002 | Kato | 714/38.12 |
| 2005/0055673 A1 | 3/2005 | Dias et al. | |
| 2007/0240118 A1 * | 10/2007 | Keren | 717/124 |
| 2008/0141221 A1 * | 6/2008 | Benesovska et al. | 717/124 |
| 2008/0301101 A1 | 12/2008 | Baratto et al. | |
| 2010/0153779 A1 * | 6/2010 | Berry | G06F 11/1438 714/18 |
| 2012/0102373 A1 | 4/2012 | Waugh | |

* cited by examiner

*Primary Examiner* — Normin Abedin
(74) *Attorney, Agent, or Firm* — Lowenstein Sandler LLP

(57) ABSTRACT

A method and system for server-side capturing, logging, and replaying terminal data of a terminal is described.

20 Claims, 8 Drawing Sheets

TERMINAL DATA LOGGER

TECHNICAL FIELD

Embodiments of the present invention relate to performance testing, and more specifically, to terminal data logger to capture, log, and replay terminal data during a terminal session.

BACKGROUND

In performance testing, there is a common practice of examining the speed, durability, and/or reliability of a tested software feature, component, or system. One of the primary concerns of software developers is identifying the cause of errors in the software applications, such as errors that cause software applications to crash unexpectedly. In order to effectively identify errors, it is important to know what interaction a user (e.g., customer or quality assurance tester) had with the software application before the error occurred. In some current solutions, when a software application experiences an error, an error report is generated to send to the software developer. As part of the report, the user may be asked to write down what they have done and what keys they pressed before the error occurred to help the software developer to reproduce the error. Unfortunately, the user may not remember exactly what they were doing and what software applications they were interacting with at the time of the error. Even if the user is able to remember the commands (or history output was available), the report is still missing some of the information, such as the program's output that could be crucial for identifying and remedying the error.

Conventional solutions provide only client-side logging that are used to record the user's interactions at the client's device. These conventional solutions, however, need to be enabled first, and is completely based on the user's will to log. One conventional solution has a client reporting tool that allows customers to record reproducible steps automatically, and ship the output file to the software vendor for more comprehensive reporting and remedying the software defect. For example, screenshots can be captured and the steps leading up to a software defect can be reproduced, such as the keyboard strokes or the mouse's cursor movements. Not only are these conventional solutions limited to client-side logging, these client-side solutions initiate the recording or logging process only in response to a defect occurring on the client and typically send the data corresponding to a graphical user interface.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1A:
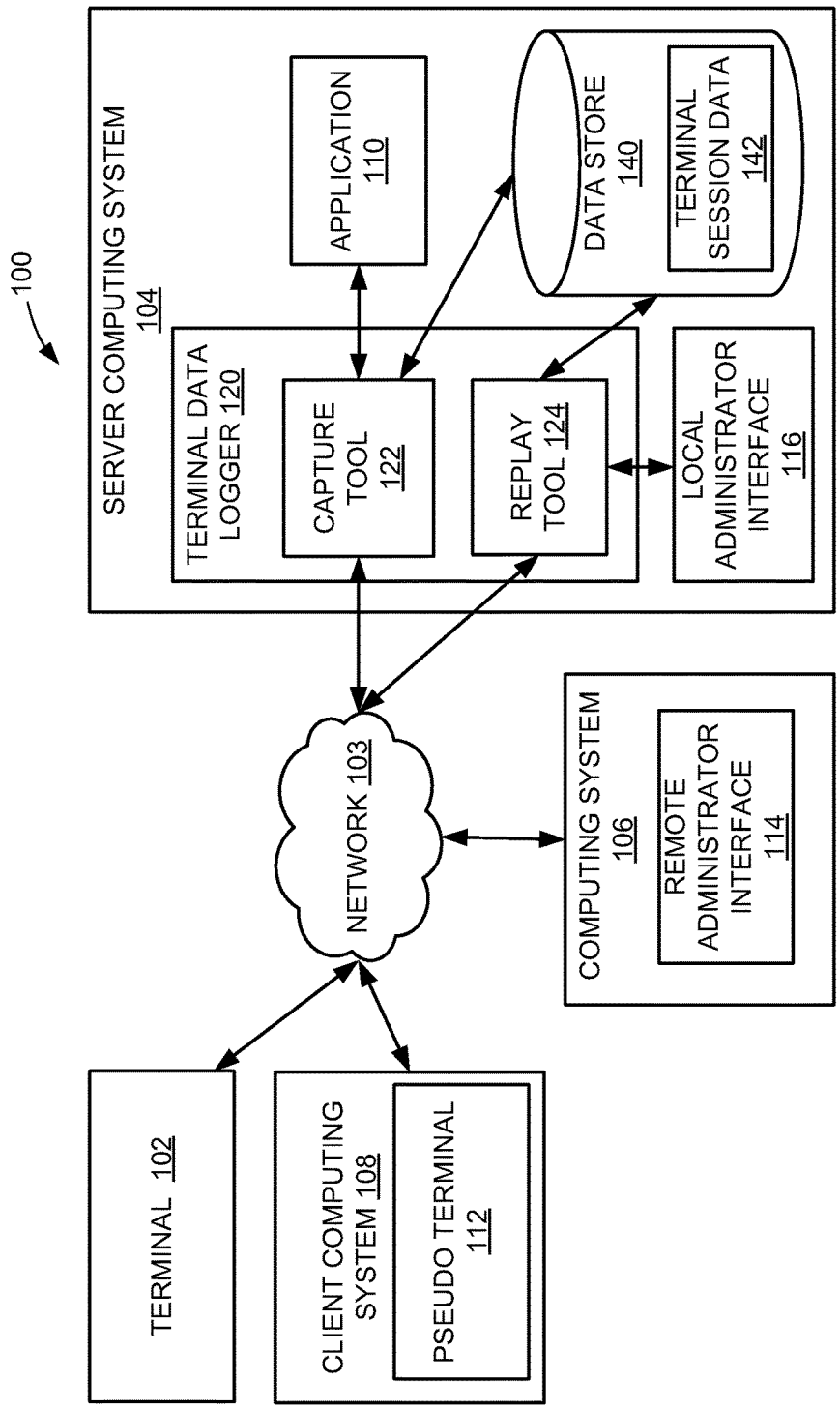
FIG. 1A is a block diagram of an exemplary network architecture in which embodiments of a terminal data logger, including a capture tool and a replay tool, may operate.

A method and system for server-side capturing, logging, and replaying terminal data of a terminal is described. In one embodiment, a server computing system communicates data with a terminal over a network, and a terminal data logger captures incoming and outgoing data of the terminal during a terminal session. The terminal may be a physical console, a serial terminal, a pseudo terminal, or the like. The incoming data represents the data input by the user in the terminal during the terminal session and the outgoing data represents the output data of the terminal being provided to the user during the terminal session. The terminal data logger stores the captured data in a data store to allow the terminal session to be recreated via an administrator interface that is separate from the terminal.

In another embodiment, the terminal data logger subsequently recreates the terminal session via the administrator interface. In one embodiment, the terminal data logger replays the stored incoming and outgoing data in the same order it was captured to recreate the terminal session via the administrator interface. In another embodiment, the terminal data logger presents an administrator interface to allow an administrator to select an option to replay the terminal session after it has been captured and stored. In response to the administrator's selection, the terminal data logger plays back the stored data of the selected terminal session in the administrator interface to recreate the terminal session.

In one embodiment, the terminal data logger can be part of a performance testing system in a client-server environment with the terminal data logger being located on the server side and the terminal being the client side. The terminal data logger may be used to examine the speed, durability, and/or reliability of the terminal or any software feature, component, or system, executing on the server computing system that communicates with the terminal over the network. The test subject may be a software feature, a software component, or a software system that executes on a computing device that is accessed by the terminal locally or over a network, such as the Internet. For example, the test subjects may be any server-side CLI applications executing on the server computing system. The terminal data logger can also be used to identify the cause of errors in the software feature, component, or system, such as errors that cause software applications to crash unexpectedly. In another embodiment, the terminal data logger can be used for auditing.

Embodiments of the present invention provide an improved system that can capture and log all data being communicated between the server computing system and the terminal. Unlike conventional solutions that provide client-side logging, the embodiments described herein are not subject to the user deciding whether to log or not, and can capture the user's input into the terminal, as well as the terminal's output. It should be noted that the embodiments described herein can perform the capturing and logging of all terminal data at any time, and not necessarily in response to detecting a defect in the software application, as done in conventional solutions. Also, unlike conventional solutions that capture graphical user interface data, which can consume significant resources to monitor, capture, and log (also referred to as recording), the embodiments described herein may capture all terminal data, incoming and outgoing data of the terminal, since the terminal data typically includes text or characters, whose resource size is almost insignificant in computing environments today. Since terminals are typically text-based, and not graphic-based, the terminal data may not consume as much resources as conventional solutions that capture and store graphical user interface data. For example, some terminals are character-based terminals in which the terminal transmits and receives data one character at a time. Alternatively, the character-based terminal may include a user interface for displaying information on the terminal via characters going through the terminal.

In the following description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "generating," "communicating," "capturing," "executing," "defining," "specifying," "creating," "recreating," "processing," "providing," "computing," "calculating," "determining," "displaying," or the like, refer to the actions and processes of a computing system, or similar electronic computing systems, that manipulates and transforms data represented as physical (e.g., electronic) quantities within the computing system's registers and memories into other data similarly represented as physical quantities within the computing system memories or registers or other such information storage, transmission or display devices.

Embodiments of the present invention also relate to an apparatus for performing the operations herein. This apparatus may be specially constructed for the required purposes, or it may comprise a general-purpose computing system specifically programmed by a computer program stored in the computing system. Such a computer program may be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

FIG. 1A is a block diagram of exemplary network architecture 100 in which embodiments of a terminal data logger 120, including a capture tool 122 and a replay tool 124, may operate. The network architecture 100 may include a server computing system 104 that executes the terminal data logger 120, a terminal 102, a client computing system 108 configured to execute a pseudo terminal 112, a computing system 106 for presenting a remote administrator interface 114, each connected via a network 103, which may be a private network (e.g., a local area network (LAN), wide area network (WAN), intranet, etc.) or a public network (e.g., the Internet). The server computing system 104 may be one or more machines including one or more server computers, gateways, or other computing systems. The server computing system 104 hosts the terminal data logger 120 and may host one or more applications 110 that interact with the user via the terminal 102 or the pseudo terminal 112 over the network 103. The server computing system 104 may execute any type of software features, software components, or software systems that may be accessed by the terminal 102 (or pseudo terminal 112) over the network 103 or by a terminal that is directly connected to the server computing system 104. The operations of the terminal data logger 120 are described in more detail below with respect to FIGS. 2A-4B.

The terminal data logger 120 may be a stand-alone application that executes on the terminal 102 or may be integrated as part of the operating system (OS) of the server computing system 104, such as in the OS kernel or more specifically in the TTY subsystem of the kernel. Alternatively, the terminal data logger 120 may be installed in a performance testing system that is used to identify and remedy errors in the software executing on the server computing system 104, or in a system used for auditing. The terminal data logger 120 may also be configured to generate one or more administrator interfaces that allow an administrator to interact with the terminal data logger 120, such as to configure the operations of the terminal data logger 120, as well as to recreate terminal sessions that are captured by the terminal data logger 120 as described herein. The administrator interface may be presented as a remote administrator interface 114 on the computing system 106 (e.g., a workstation of the administrator that allows remote access to the server computing system 104). Alternatively, the administrator interface may be presented as a local administrator interface 116 on the server computing system 104. The local administrator interface 116 may be used when the administrator is logged on directly to the server computing system 104, as opposed to remotely accessing the server computing system 104 via the computing system 106. The administrator interface may be an interface that allows the administrator to replay the terminal data captured by the terminal data logger 120. The administrator interface may be a graphical user interface or a text-based or character-based interface in which the terminal session can be recreated as described herein.

The terminal 102, sometimes referred to as a computer terminal, is an electrical or electromechanical hardware device that is used fore entering data into, and displaying data from, the server computing system 104. Typically, the function of a terminal is confined to display and input of data, although some terminals may be smart terminals, such as thin and fat clients. In another embodiment, the terminal 102 is a physical console. In another embodiment, the terminal 102 is a serial terminal.

The term "terminal," as used herein, may refer to a physical hardware terminal, but may also include software or pseudo terminals (e.g., pseudo terminal 112) that emulate the function of the physical hardware terminal. Pseudo terminals 112 can be used to allow concurrent use of local programs and access to a distant terminal host system (e.g., server computing system 104). Pseudo terminals may provide a text terminal interface without associated virtual console, computer terminal, or serial port hardware. Instead, a process assumes the role of the underlying hardware for the pseudo terminal session. Applications of pseudo terminals include xterm and similar terminal emulators in which the terminal emulator process is associated with the master device and the shell is associated with the slave. Any terminal operations performed by the shell in a terminal emulator session are received and handled by the terminal emulator process itself (such as terminal resizing or terminal resets). The terminal emulator process receives input from the keyboard and mouse using windowing events, and is thus able to transmit these characters to the shell, giving the shell the appearance of the terminal emulator being an underlying hardware object. Other applications include remote login handlers such as Secure Shell (SSH) and telnet servers, which serve as the master for a corresponding shell, bridged by a pseudo terminal. In one embodiment, the pseudo terminal 112 is a SSH terminal. SSH is a network protocol used on public or private networks that allow data to be exchanged using a secure channel between the networked devices. In another embodiment, the pseudo terminal 112 is a telnet terminal. Telnet is a network protocol used on public or private networks to provide bidirectional interactive text-oriented communications using a virtual terminal connection. The user data is interspersed with control information in a data connection over the Transmission Control Protocol (TCP). Telnet provides access to a command-line interface on a remote host (e.g., the server computing system 104). It should also be noted that the terms "telnet" and "SSH" may also refer to the software that implements the client part of the protocol. Telnet and SSH client applications are available for virtually all computer platforms. When a user opens a telnet and SSH client application, the client application obtains a login prompt to a command line text interface or a character-based full-screen manager hosted on the remote host (e.g., server computing system 104). Alternatively, other types of pseudo terminals may be used as would be appreciated by one of ordinary skill in the art having the benefit of this disclosure.

As described above, the terminal 102 may be a text terminal, which is a serial computer interface for text entry and display. Information may be presented as an array of pre-selected formed characters. In its simplest form, the text terminal is similar to a file, where writing to the file displays the text and reading form the file produces what the user enters. These files can be referred to as device files, which are interfaces for a device driver that appears in a file system as if it were an ordinary file. The device files allow software to interact with a device driver using standard input/output system calls.

The terminal 102 may provide a command-line interface or text-based interface, which may be convenient for computer programmers. The terminal 102 may also be a character-oriented terminal (also referred to as character-based terminal) that communicates with its host one character at a time. The character-based terminal may use character devices that relate to devices through which the system transmits data one character at a time. These device nodes often serve for stream communication with devices such as mice, keyboards, virtual terminals, and serial modems, and usually do not support random access to data. The system reads each character from the device immediately or writes each character to the device immediately without the use of buffered input and output routines. In one embodiment of character-based terminals, the incoming and outgoing data of the terminal may include characters and control characters. In another embodiment of character-based terminals, the terminal includes a user interface for displaying information on the terminal via characters going through the terminal 102. Alternatively, the terminal 102 may be other types of terminals as would be appreciated by one of ordinary skill in the art having the benefit of this disclosure.

In one embodiment, the terminal data logger 120 includes the capture tool 122 to capture incoming and outgoing data of the terminal 102 or of the pseudo terminal 112 during a terminal session. The incoming and outgoing data includes data input by a user in the terminal during the terminal session and output data of the terminal provided to the user during the terminal session. The capture tool 122 also stores the captured data, labeled as the terminal session data 142 in a data store 140, which is communicatively coupled to the terminal data logger 120. The data store 140 may be, for example, a database that stores the terminal session data 142. The terminal session data 142 of the data store 140 may be stored in any type of data storage, such as one or more storage devices (e.g., the computer-readable medium described above) that are local to the server computing system 104 and/or remote from server computing system 104. For simplification of the following discussion, the following embodiments describe "terminal 102" or "terminal," but should not be taken to include only physical terminals, but should also include all types of terminals, including pseudo terminal 112.

The terminal data logger 120 also includes the replay tool 124 to subsequently recreate the terminal session by replaying the terminal session data 142 via the administrator interface (e.g., local administrator interface 116 or remote administrator interface 114). It should be noted that the administrator interface is separate from a user interface of the terminal 102. In one embodiment, the replay tool 124 includes a user interface generator that generates the administrator interface to allow an administrator to select an option to replay the terminal session data 142, and a player to playback the terminal session in the administrator interface in response to the administrator's selection of the option. The administrator interface (e.g., 116 or 114) may be GUI, a command line interface (CLI), or other types of interfaces known by those of ordinary skill in the art. In another embodiment, the administrator interface may emulate the interface of the terminal 102, as seen by the user of the terminal 102. It should also be noted that the administrator interface can be used to allow the administrator to configure the terminal data logger 120. For example, an administrator of the terminal data logger 120 can access the terminal data logger 120 via a browser, in which case the administrator interface is a web-based browser. When using a web-based browser for the administrator interface, the administrator interface may contain one or more web pages that include input fields, or other input mechanisms that allow the user to interact with the terminal data logger 120, such as to configure the terminal data logger 120.

Figure 1B:
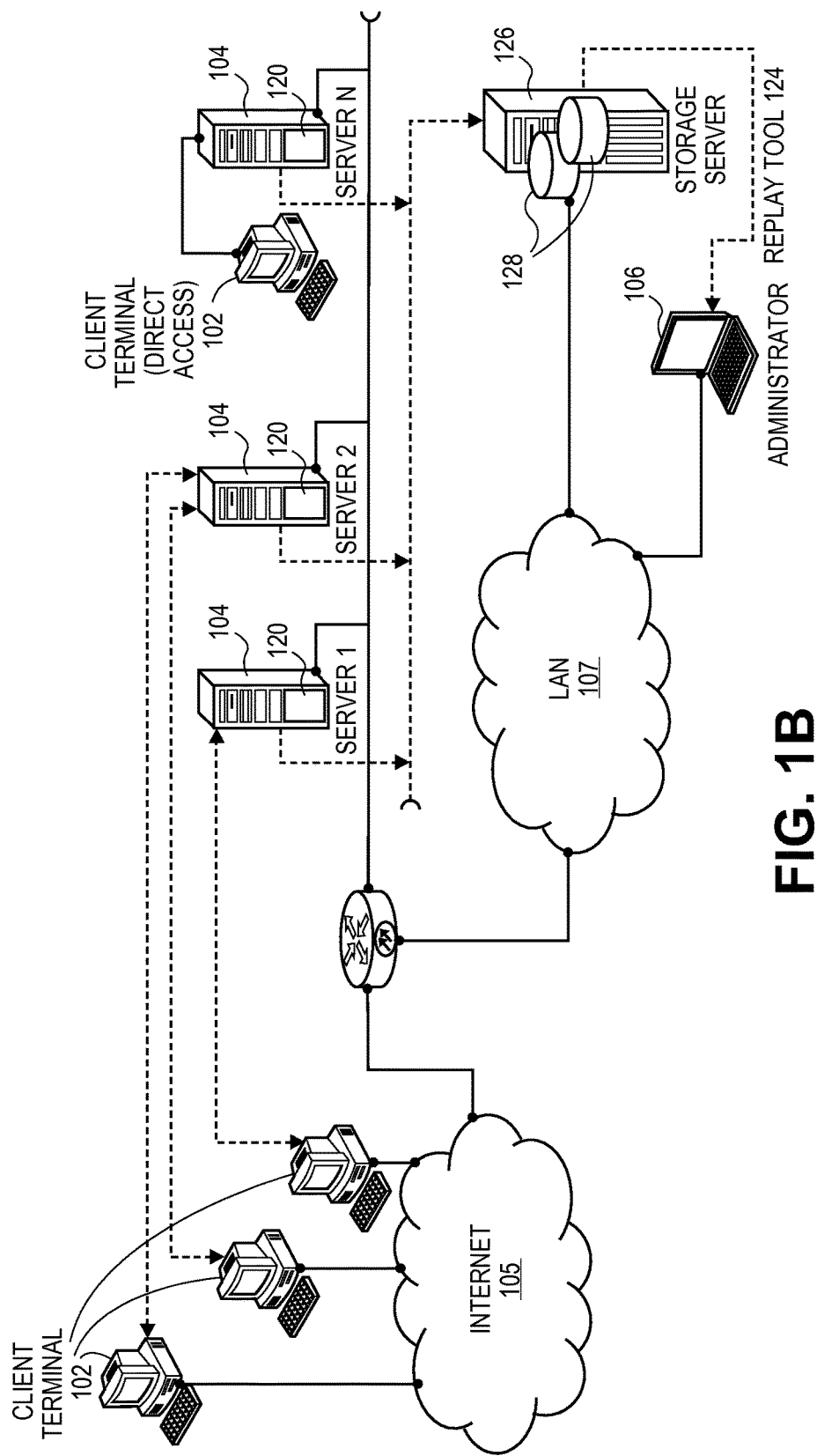
FIG. 1B is a schematic diagram of one embodiment of a deployment of the terminal data logger of FIG. 1A in another exemplary network architecture.

FIG. 1B is a schematic diagram of one embodiment of a deployment of the terminal data logger of FIG. 1A in another exemplary network architecture. The network architecture of FIG. 1B includes multiple client terminals 102, multiple server computing systems 104, a storage server 126, the client computing system 106, each of which are connected via the Internet 105 and LAN 107. The solid lines of FIG. 1B represent physical connections and the dashed lines represent logical connections. In this embodiment, the server computing systems 104 each hosts an instance of the terminal data logger 120. In this embodiment, the terminal data logger 120 captures the terminal data communicated between the respective server computing system 104 and the respective client terminal 102. The client terminal 102 may be a physical terminal or may be pseudo terminal as described above. The depicted embodiment illustrates that one of the server computing systems 104 may have logical connections to two client terminals. The depicted embodiment also illustrates that one of the server computing systems 104 may have a direct access connection with one of the client terminals. In this embodiment, the direct access may include a monitor and keyboard that are directly connected to the server computing system 104. It should be noted that the terminal data logger 120 can log and save all the interactions with the terminals 102 despite being remote or local as depicted in FIG. 1B.

The depicted embodiment also illustrates the server computing systems 104 being coupled to the storage server 126. The terminal data logger 120 can capture the terminal data of the respective terminal sessions and store the terminal data in data storage 128 associated with the storage server 126. In one embodiment, the terminal data logger 120 has the capture tool 122 and the replay tool 124, as described above. In another embodiment, the terminal data logger 120 includes the capture tool 122, but the replay tool 124 is hosted by the client computing system 106, which has access to the terminal session data stored at the storage server 126 within the LAN 107. In another embodiment, the terminal data logger 120 includes 1) a data extractor (also referred to as a logger), which resides in the operating system (OS) kernel, such as in the TTY subsystem, and which collects the terminal data; 2) a logger daemon, which is a regular user-space service that saves the collected data either to local or remote storage; and 3) a logger replay application (e.g., replay tool 124), which is used by the administrator to replay the collected terminal data on the administrator's computing system (e.g., 106). The logger replay application may be an independent component that can be installed in any computing system to replay the collected terminal data.

Figure 2A:
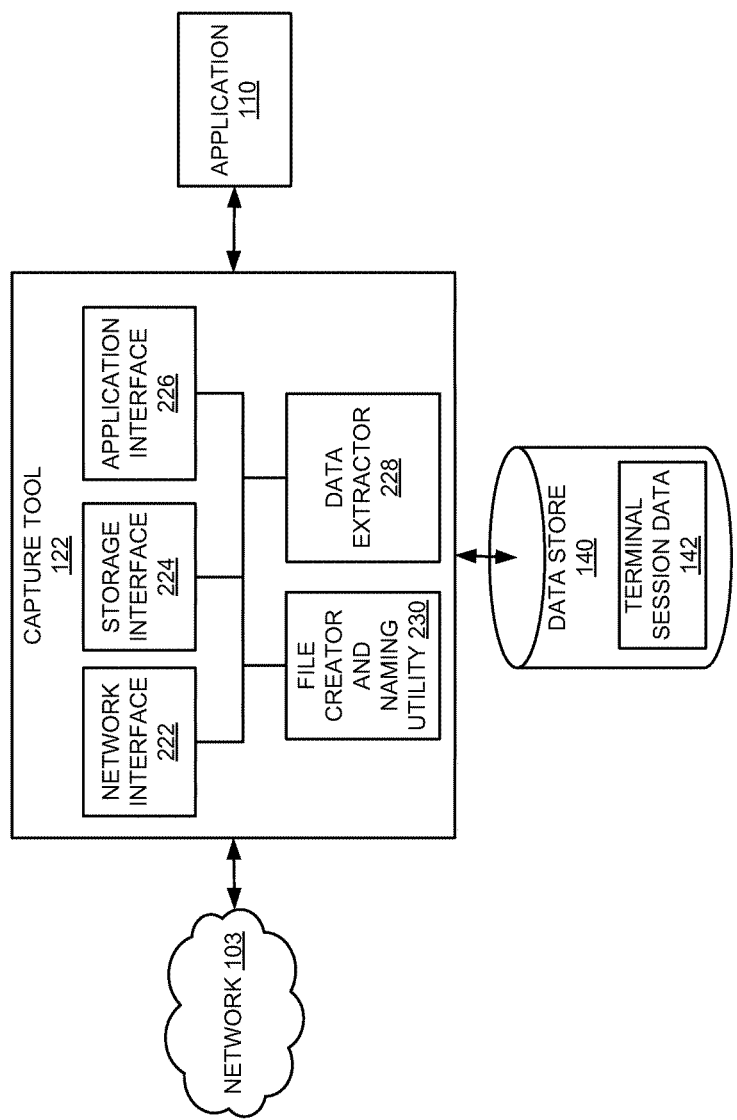
FIG. 2A is a block diagram of the capture tool according to one embodiment.

FIG. 2A is a block diagram of the capture tool 122 according to one embodiment. In the depicted embodiment, the capture tool 122 includes a network interface 222, a storage interface 224, an application interface 226, a data extractor 228, and a file creator and naming utility 230. The user accesses the application 110 via the terminal 102, as described above, and the capture tool 122 resides in the communication data path between the application 110 and the terminal 102. The network interface 222 receives the terminal data from the terminal 102 over the network 103 and passes the terminal data to the application interface 226 to be sent to the application 110. Similarly, the application interface 226 receives terminal data from the application 110 and passes the terminal data to the network interface 222 to be sent to the terminal 102 over the network 103. The data extractor 228 captures the terminal data being sent to the terminal 102 (outgoing data) and being received from the terminal 102 (incoming data). The data extractor 228, using the storage interface 224, stores the captured data as the terminal session data 142 of the data store 140. When a terminal session is started, or when the terminal data logger 120 starts to log the terminal session, the file creator and naming utility 230 creates a file in which the captured data can be stored, and names the file with a unique filename. In one embodiment, the file creator and naming utility 230 names the file with a name of the terminal session. In another embodiment, the file creator and naming utility 230 creates a timestamp at the start or end of the terminal session and names the file with the timestamp. The start or end of the terminal session may be when the terminal session is started or finished or it may be when the terminal data logger 120 starts and stops logging the terminal session. In another embodiment, the file creator and naming utility 230 can name the file using the terminal session name and a timestamp. Alternatively, the file creator and naming utility 230 can name the files, containing the respective terminal session data 142, using other naming techniques as would be appreciated by one of ordinary skill in the art having the benefit of this disclosure.

Figure 2B:
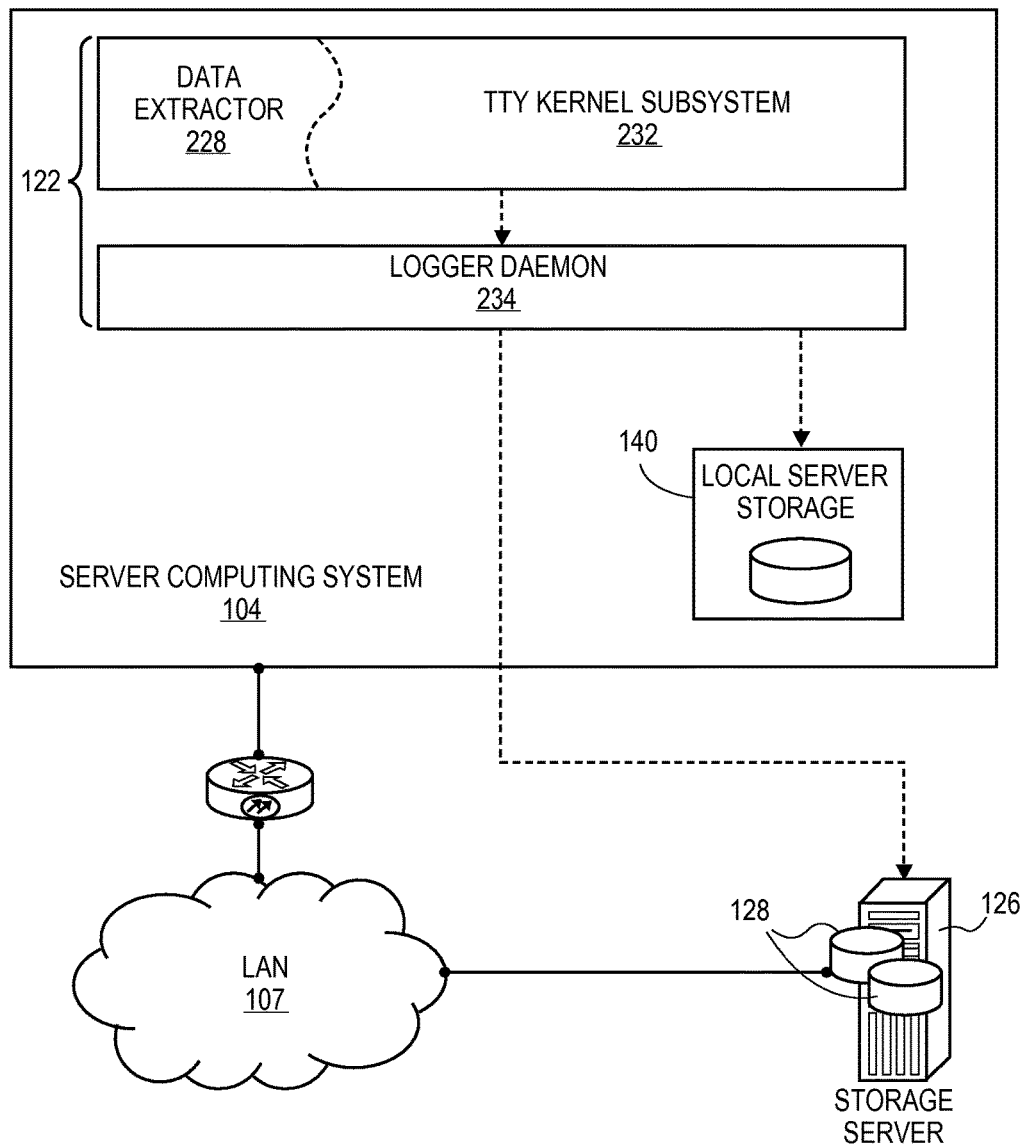
FIG. 2B is a block diagram of the capture tool according to another embodiment.

FIG. 2B is a block diagram of the capture tool 122 according to another embodiment. In this embodiment, the capture tool 122 includes a data extractor 228 and logger daemon 234. The solid lines of FIG. 2B represent physical connections and the dashed lines represent logical connections. The data extractor 228 (also referred to as a logger) resides in the TTY kernel subsystem 232, which allows the data extractor 228 to capture all terminal data, including incoming and outgoing data. The logger daemon 234 is a service that saves the terminal data, which has been collected by the data extractor 228, into local or remote storage. In this embodiment, the logger daemon 234 can store the collected terminal data into at least one of a local server storage 140 or the storage server 126 over the LAN 107.

In the depicted embodiment, the data extractor 228 and logger daemon 234 are deployed together as integrated components of the OS of the server computing system 104 where all interactions are intended to be logged, such as for a future audit of the interactions. In this embodiment, the replay tool application may be independent of the data extractor 228 and logger daemon 234, and may not be installed at the same server computing system 104 as the data extractor 228 and logger daemon 234. The replay application can be installed on the administrator's computing system which is used to replay the terminal data. In one embodiment, the deployment of the terminal data logger 120 is used for audit purposes. In another embodiment, the deployment of the terminal data logger 120 is used for software quality engineering, including performance testing. Alternatively, the deployment of the terminal data logger 120 may be used for other purposes as would be appreciated by one of ordinary skill in the art having the benefit of this disclosure.

Figure 3:
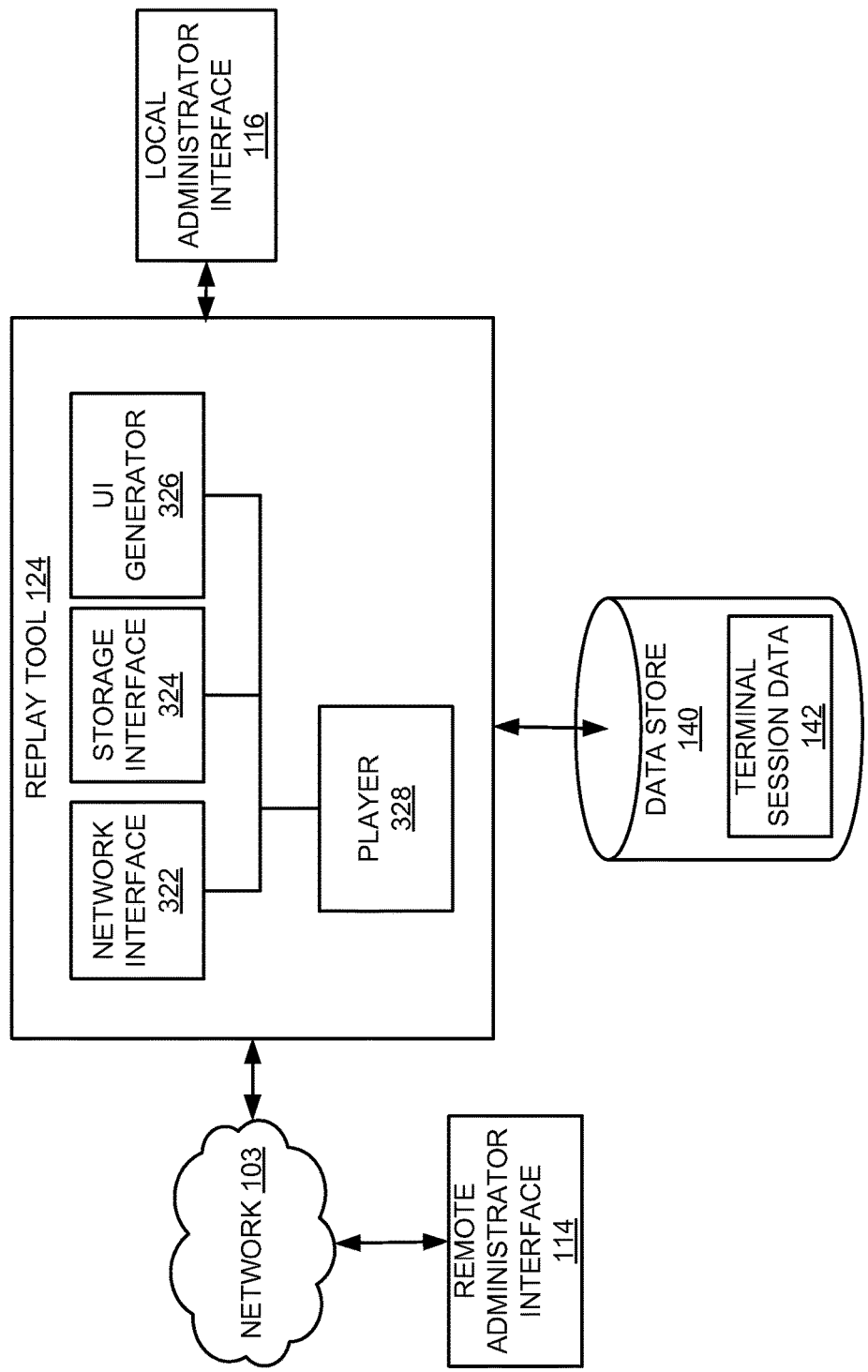
FIG. 3 is a flow diagram of the replay tool according to one embodiment.

FIG. 3 is a flow diagram of the replay tool 124 according to one embodiment. In the depicted embodiment, the replay tool 124 includes a network interface 322, a storage interface 324, a user interface UI generator 326, and a player 328. The UI generator 326 is configured to generate an administrator interface to allow an administrator to select an option to recreate the terminal session. In one embodiment, the UI generator 326 generates the local administrator interface 116. In another embodiment, the UI generator 326 generates the remote administrator interface 114. The UI generator 326 sends the remote administrator interface 114 to the computing system 106 over the network 103 using the network interface 322. The network interface 322 receives and sends communication between the remote administrator interface 114 and the replay tool 124. In order to generate the administrator interface, the UI generator 326 accesses the terminal session data 142 via the storage interface 324. The UI generator 326 can generate, for example, a list of terminal sessions stored in the data store 140, each terminal session corresponding to a file containing the respective terminal session data 142. The list of terminal sessions may be represented as a list of files with the filenames of the terminal sessions. Alternatively, the list of terminal session may be represented as a brief description of the terminal session, such as a date and time of the terminal session, the type of terminal session, or the like. It should be noted that the capture tool 122 may have previously captured the terminal session data 142. Alternatively, the terminal session data 142 may be terminal data that was logged or recorded by another tool on another computing system and stored in the data store 140 to allow the administrator to replay the terminal session data 142 via the administrator interface as would be appreciated by one of ordinary skill in the art having the benefit of this disclosure. For example, the terminal data may be logged and stored at the storage server 126 of FIG. 1B, and accessed by the computing system 106. The UI generator 326 can also provide an option on the administrator interface that allows the administrator to select one of the terminal sessions to be recreated. In response to the administrator's selection, the player 328 access the respective file containing the terminal session data 142 of the selected terminal session, and plays back the captured data of the terminal session via the administrator interface (e.g., 116 or 114).

Figure 4A:
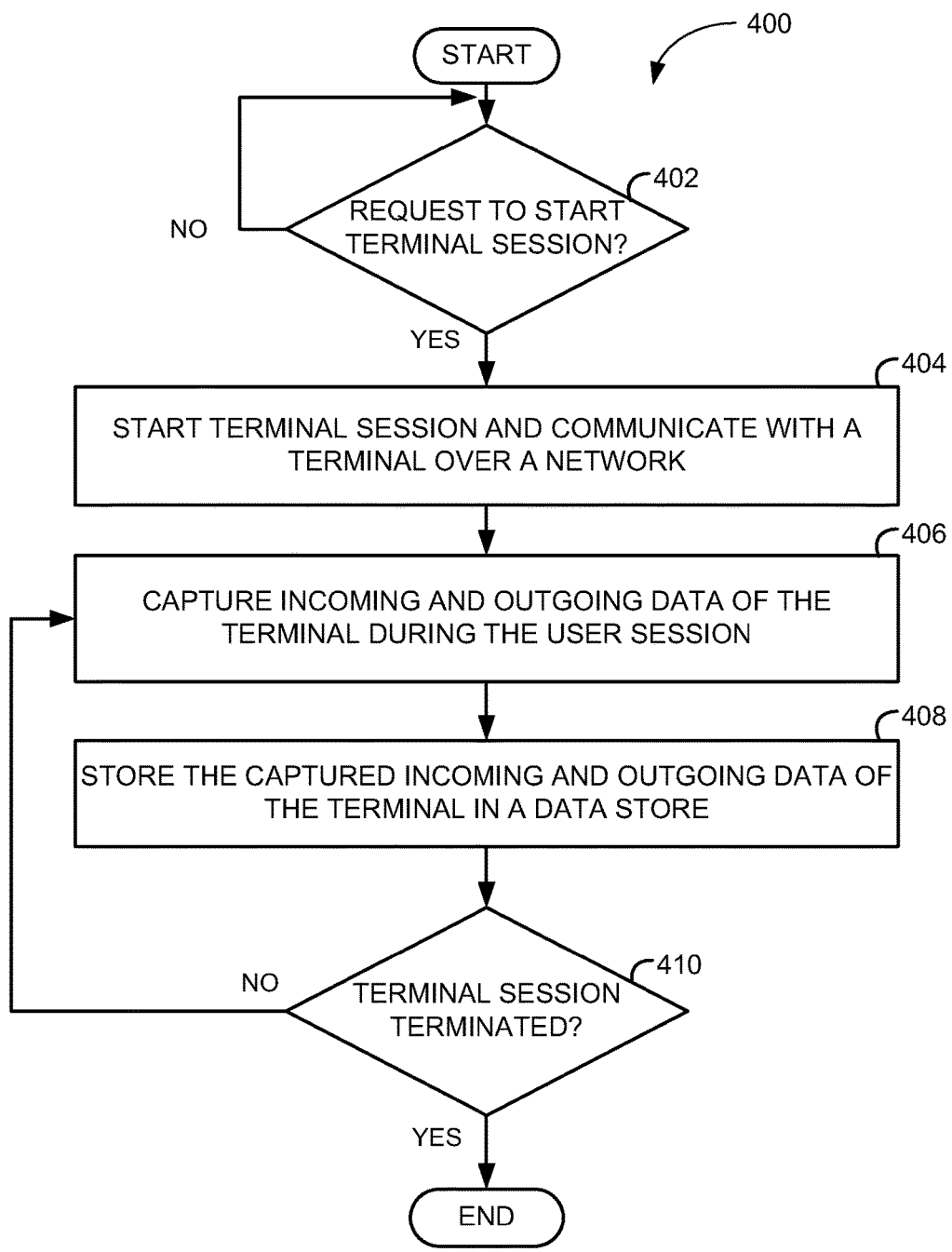
FIG. 4A is a flow diagram of one embodiment of a method of capturing terminal data during a terminal session.

FIG. 4A is a flow diagram of one embodiment of a method 400 of capturing terminal data during a terminal session. The method 400 is performed by processing logic that may comprise hardware (circuitry, dedicated logic, etc.), software (such as is run on a general purpose computing system or a dedicated machine), firmware (embedded software), or any combination thereof. In one embodiment, the terminal data logger 120 of FIG. 1A performs the method 400. In another embodiment, the capture tool 122 of FIGS. 1A, 1B, and 2A, and 2B performs the method 400. Alternatively, other components of the server computing system 104 can perform some or all of the operations of method 400.

Referring to FIG. 4A, processing logic begins with determining whether a request to start a terminal session on a terminal is received from a terminal over a network (block 402). If at block 402 a request to start the terminal session is received, the processing logic starts a terminal session and starts communicating with the terminal over the network (block 404); otherwise, the processing logic waits until a request to start a terminal session is received at block 402. Next, processing logic captures incoming and outgoing data of the terminal during the terminal session (block 406), and stores the captured incoming and outgoing data of the terminal in a data store (e.g., data storage 140) (block 408). While capturing and storing at blocks 406 and 408, the processing logic determines if the terminal session has been terminated (block 410), for example, in response to the user closing the terminal, the user logging off from the terminal, or when the terminal loses power. If, at block 410, the processing logic determines that the terminal session has been terminated, the processing logic ends the method 400; otherwise, the processing logic returns to block 406 to continue capturing incoming and outgoing data of the terminal during the terminal session, and subsequently storing the captured data in the data store at block 408.

In one embodiment at block 408, the processing logic creates a file to store the incoming and outgoing data in the data store, and names the file with a unique name. In one embodiment, the processing logic names the file with the name of the terminal session. For example, if the terminal is pseudo terminal, the terminal session may be given the name of the pseudo terminal. Alternatively, the terminal session can be given the name of the pseudo terminal as well as another identifier, such as the date or time, or an instance number of the pseudo terminal. The file name can be used for storing the captured data for subsequent recreation of the terminal session as described below with respect to FIG. 4B. In another embodiment, the processing logic names the terminal session by creating a time stamp at the start or end of the terminal session and naming the file with the timestamp. Alternatively, the processing logic can name the file using other techniques as would be appreciated by one of ordinary skill in the art having the benefit of this disclosure, such as creating a file name with the timestamp and the name of the terminal session.

In another embodiment, the processing logic stores the captured data to allow the user or an administrator to recreate the captured terminal session as described below.

Figure 4B:
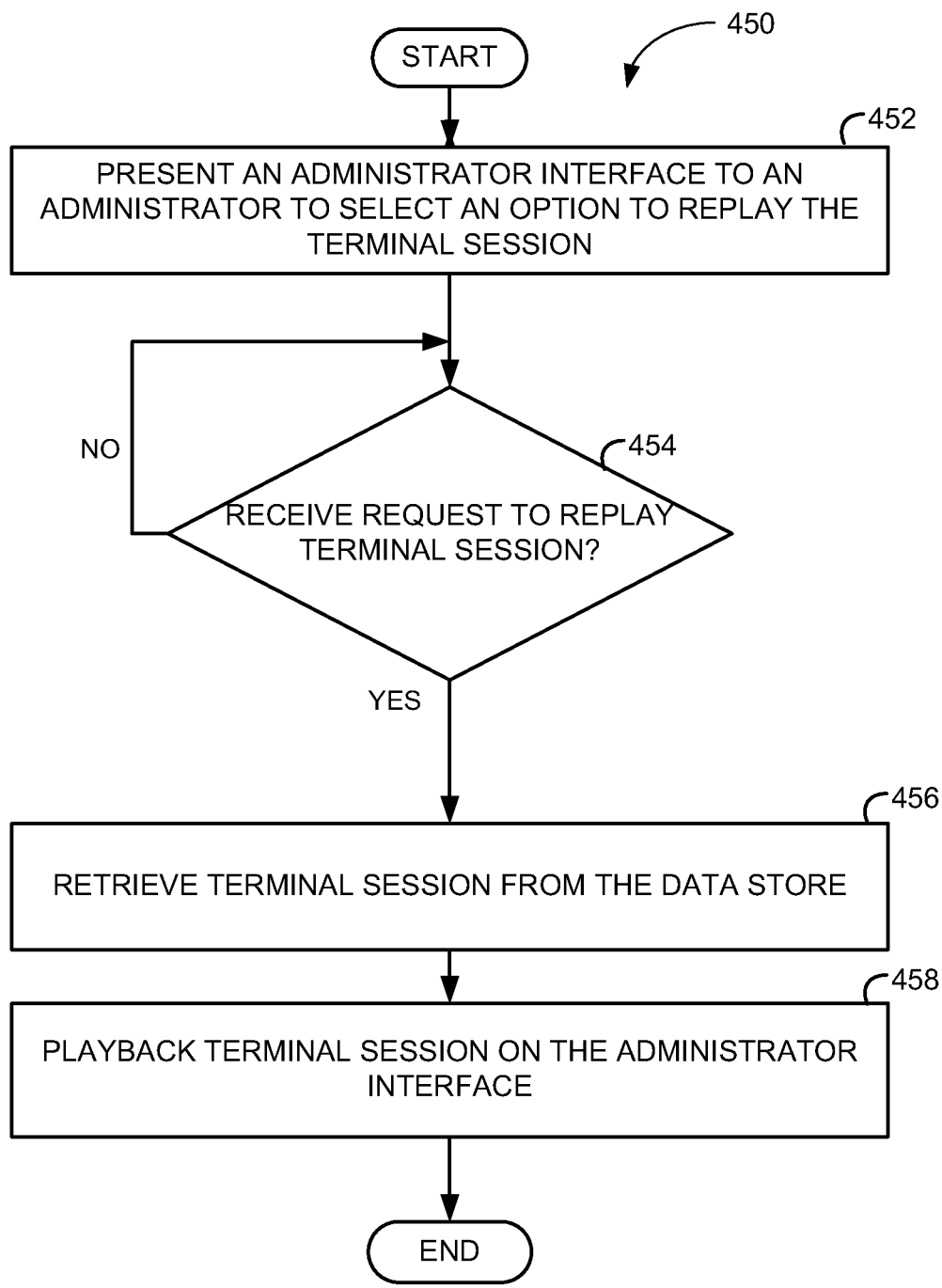
FIG. 4B is a flow diagram of one embodiment of a method of replaying the captured terminal session.

FIG. 4B is a flow diagram of one embodiment of a method 450 of replaying the captured terminal session. The method 450 is performed by processing logic that may comprise hardware (circuitry, dedicated logic, etc.), software (such as is run on a general purpose computing system or a dedicated machine), firmware (embedded software), or any combination thereof. In one embodiment, the terminal data logger 120 of FIG. 1A performs the method 450. In another embodiment, the replay tool 124 of FIGS. 1A, 1B, and 3 performs the method 450. Alternatively, other components of the server computing system 104 can perform some or all of the operations of method 450.

Referring to FIG. 4B, processing logic begins with presenting an administrator interface to an administrator to select an option to replay the terminal session (block 452). The administrator interface is separated from a user interface of the terminal. In one embodiment, the processing logic displays a list of terminal sessions that have been stored, for example, displaying a list of the saved files containing the captured terminal sessions. The administrator may select the option to replay one of the terminal sessions. At block 454, the processing logic determines if a request to replay one or more of the terminal sessions is received. If at block 454, a request has not been received, the processing logic waits until the request to play is received. When the request to replay has been received at block 454, the processing logic retrieves the identified terminal session from the data store (block 456), and plays back the terminal session via the administrator interface provided to the administrator.

In one embodiment, the processing logic subsequently recreates the terminal session by replaying the stored incoming and outgoing data in the same order it was captured on the administrator interface. In another embodiment, the processing logic presents the administrator interface to an administrator that has logged into the server computing system 104 (e.g., local administrator interface 116). In another embodiment, the processing logic presents the administrator interface to the administrator over the network 103, for example, when the administrator logs into the server computing system 104 from a remote computing system (e.g., remote administrator interface 114 of computing system 106).

Figure 5:
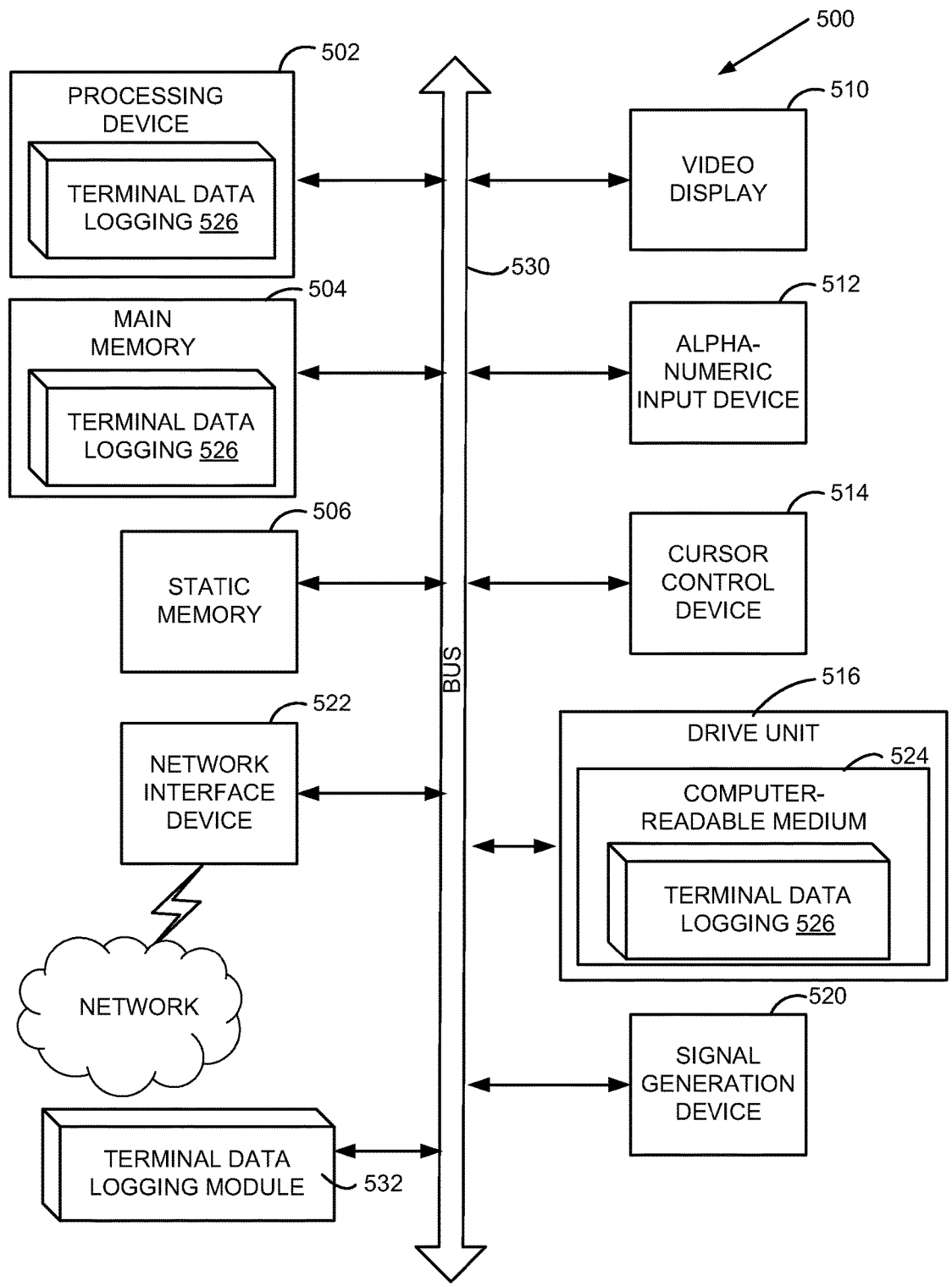
FIG. 5 illustrates a diagrammatic representation of a machine in the exemplary form of a computing system for terminal data logging.

FIG. 5 illustrates a diagrammatic representation of a machine in the exemplary form of a computing system 500 for terminal data logging. Within the computing system 500 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for terminal data logging, such as the methods 400 and 450 described above. In one embodiment, the computing system 500 represents various components that may be implemented in the terminal 102 as described above. Alternatively, the terminal 102 may include more or less components as illustrated in the computing system 500.

The exemplary computing system 500 includes a processing device 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a data storage device 516, each of which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic (e.g., terminal data logging 526) for performing the operations and steps discussed herein.

The computing system 500 may further include a network interface device 522. The computing system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable storage medium 524 on which is stored one or more sets of instructions (e.g., terminal data logging 526) embodying any one or more of the methodologies or functions described herein. The terminal data logging 526 may also reside, completely or at least partially, within the main memory 504 and/or within the processing device 502 during execution thereof by the computing system 500, the main memory 504 and the processing device 502 also constituting computer-readable storage media. The terminal data logging 526 may further be transmitted or received over a network via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The terminal data logging module 532, components, and other features described herein (for example in relation to FIGS. 1A, 1B, 2A, 2B, and 3) can be implemented as discrete hardware components or integrated in the functionality of hardware components such as ASICS, FPGAs, DSPs, or similar devices. The terminal data logging module 532 may implement operations of terminal data logging as described herein with respect to FIGS. 4A and 4B. In addition, the terminal data logging module 532 can be implemented as firmware or functional circuitry within hardware devices. Further, the terminal data logging module 532 can be implemented in any combination hardware devices and software components.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method comprising:
   starting a terminal session between a server computing device and a terminal emulator over a network, wherein the terminal emulator comprises a pseudo terminal executing on a client computing device, and wherein the pseudo terminal comprises at least one of a Secure Shell (SSH) terminal or a telnet terminal;
   capturing from the start of the terminal session, at an operating system kernel of the server computing device, incoming and outgoing data of the terminal emulator during the terminal session, wherein the incoming and outgoing data comprises data input by a user in the terminal emulator during the terminal session via a user interface and output data displayed by the terminal emulator during the terminal session, wherein the user interface comprises a character-based terminal including at least one of a command-line interface or a text-based interface, wherein the incoming and outgoing data comprises characters and control characters, and wherein the user interface displays information on the terminal emulator via characters going through the terminal emulator;
   in response to the terminal emulator losing power:
      determining, by a processing device, that the terminal session is terminated;

storing the captured incoming and outgoing data in a data store of the server computing device;

presenting, by the server computing device, an administrator interface that is different from the user interface of the terminal emulator to allow an administrator to select an option to recreate the terminal session on the administrator interface after the storing; and in response to a selection of the option, recreating, by the processing device, the terminal session via the administrator interface by playing back the stored incoming and outgoing data of the terminal session in the administrator interface.

2. The method of claim 1, wherein the recreating the terminal session comprises replaying the stored incoming and outgoing data in a same order the incoming and outgoing data was captured to recreate the terminal session on the administrator interface.

3. The method of claim 1, wherein the storing comprises:
creating a file to store the incoming and outgoing characters in the data store; and
naming the file with a filename.

4. The method of claim 3, wherein the naming comprises naming the file with a name of the terminal session.

5. The method of claim 3, wherein the naming comprises:
creating a timestamp at a start or end of the terminal session; and
naming the file with the timestamp.

6. The method of claim 3, wherein the naming comprises:
creating a timestamp at a start or end of the terminal session; and
naming the file with the timestamp and a name of the terminal session.

7. The method of claim 1, further comprising communicating data between an application on the server computing device and the terminal emulator over the network.

8. The method of claim 1, wherein the administrator interface is a web-based browser.

9. A non-transitory computer readable storage medium including instructions that, when executed by a processing device in a server computing device, cause the processing device to:
start a terminal session between the server computing device and a terminal emulator over a network, wherein the terminal emulator comprises a pseudo terminal executing on a client computing device, and wherein the pseudo terminal comprises at least one of a Secure Shell (SSH) terminal or a telnet terminal;
capture from the start of the terminal session, at an operating system kernel of the server computing device, incoming and outgoing data of the terminal emulator during the terminal session, wherein the incoming and outgoing data comprises data input by a user in the terminal emulator during the terminal session via a user interface and output data displayed by the terminal emulator during the terminal session, wherein the user interface comprises a character-based terminal including at least one of a command-line interface or a text-based interface, wherein the incoming and outgoing data comprises characters and control characters, and wherein the user interface displays information on the terminal emulator via characters going through the terminal emulator;
in response to the terminal emulator losing power:
determine, by the processing device, that the terminal session is terminated;
store the captured incoming and outgoing data in a data store of the server computing device;
present, by the server computing device, an administrator interface that is different from the user interface of the terminal emulator to allow an administrator to select an option to recreate the terminal session on the administrator interface after the storing; and
in response to a selection of the option, recreating, by the processing device, the terminal session via the administrator interface by playing back the stored incoming and outgoing data of the terminal session in the administrator interface.

10. The non-transitory computer readable storage medium of claim 9, wherein to recreate the terminal session comprises replay the stored incoming and outgoing data in a same order the incoming and outgoing data was captured to recreate the terminal session on the administrator interface.

11. The non-transitory computer readable storage medium of claim 9, wherein to store the captured incoming and outgoing data comprises:
create a file to store the incoming and outgoing data in the data store; and
name the file with a unique filename.

12. The non-transitory computer readable storage medium of claim 11, wherein to name the file with a unique filename, the processing device is to name the file with a name of the terminal session.

13. The non-transitory computer readable storage medium of claim 11, wherein to name the file with a unique filename comprises:
create a timestamp at a start or end of the terminal session; and
name file with the timestamp.

14. The non-transitory computer readable storage medium of claim 11, wherein to name the file with a unique filename comprises:
creating a timestamp at a start or end of the terminal session; and
naming the file with the timestamp and a name of the terminal session.

15. The non-transitory computer readable storage medium of claim 9, wherein the administrator interface is a web-based browser.

16. A server computing device, comprising:
a data storage device; and
a processing device, operatively coupled to the data storage device, the processing device to execute a terminal data logger to:
start a terminal session between the server computing device and a terminal emulator over a network, wherein the terminal emulator comprises a pseudo terminal executing on a client computing device, and wherein the pseudo terminal comprises at least one of a Secure Shell (SSH) terminal or a telnet terminal;
in response to a start of the terminal session, capture from the start of the terminal session, at an operating system kernel of the server computing device, incoming and outgoing data of the terminal emulator during the terminal session, wherein the incoming and outgoing data comprises data input by a user in the terminal emulator during the terminal session via a user interface and output data displayed by the terminal emulator during the terminal session, wherein the user interface comprises a character-based terminal including at least one of a command-line interface or a text-based interface, wherein the incoming and outgoing data comprises characters and control characters, and wherein the user interface displays information on the terminal emulator via characters going through the terminal emulator;

in response to the terminal emulator losing power:
determine, by the processing device, that the terminal session is terminated;

store the captured incoming and outgoing data in the data storage device;

present, by the server computing device, an administrator interface that is different from the user interface of the terminal emulator to allow an administrator to select an option to recreate the terminal session on the administrator interface after the storing; and in response to a selection of the option, recreate, by the processing device, the terminal session via the administrator interface by playing back the stored incoming and outgoing data of the terminal session in the administrator interface.

17. The server computing device of claim 16, wherein the administrator interface is to display characters shown by the terminal emulator.

18. The server computing device of claim 16, wherein to store the captured incoming and outgoing data, the processing device is to:
create a file to store the incoming and outgoing data in the data store;
create a timestamp at a start or end of the terminal session; and
name the file with the timestamp.

19. The server computing device of claim 16, wherein the administrator interface is a web-based browser comprising input fields to configure the terminal data logger.

20. The server computing device of claim 16, wherein to store the captured incoming and outgoing data comprises:
create a file to store the incoming and outgoing data in the data storage device; and
name the file with a unique filename.

* * * * *